US012032129B2

(12) United States Patent
Si

(10) Patent No.: US 12,032,129 B2
(45) Date of Patent: Jul. 9, 2024

(54) CAMERA OPTICAL LENS

(71) Applicant: Raytech Optical (Changzhou) Co., Ltd, Changzhou (CN)

(72) Inventor: Congfang Si, Shenzhen (CN)

(73) Assignee: RAYTECH OPTICAL (CHANGZHOU) CO., LTD, Changzhou (CN)

( * ) Notice: Subject to any disclaimer, the term of this patent is extended or adjusted under 35 U.S.C. 154(b) by 599 days.

(21) Appl. No.: 17/136,026

(22) Filed: Dec. 29, 2020

(65) Prior Publication Data
US 2022/0113503 A1    Apr. 14, 2022

(30) Foreign Application Priority Data
Oct. 13, 2020   (CN) .......................... 202011088171.6

(51) Int. Cl.
*G02B 9/64* (2006.01)
*G02B 13/00* (2006.01)
*G02B 13/06* (2006.01)
*G02B 27/00* (2006.01)

(52) U.S. Cl.
CPC .......... *G02B 13/0045* (2013.01); *G02B 9/64* (2013.01); *G02B 13/06* (2013.01); *G02B 27/0025* (2013.01)

(58) Field of Classification Search
CPC .. G02B 13/0045; G02B 13/06; G02B 13/002; G02B 13/001; G02B 9/64; G02B 27/0025
See application file for complete search history.

(56) References Cited

U.S. PATENT DOCUMENTS

| | | | | |
|---|---|---|---|---|
| 9,557,542 | B2 * | 1/2017 | Takada | ............... G02B 13/0045 |
| 2015/0212304 | A1 * | 7/2015 | Takada | .................. G02B 15/16 |
| | | | | 348/240.3 |
| 2021/0364746 | A1 * | 11/2021 | Chen | ...................... G02B 13/04 |
| 2021/0382281 | A1 * | 12/2021 | Huang | ............... G02B 27/0012 |
| 2022/0113505 | A1 * | 4/2022 | Wang | ..................... G02B 13/06 |
| 2022/0113514 | A1 * | 4/2022 | Shi | ..................... G02B 27/0025 |

FOREIGN PATENT DOCUMENTS

| | | | | |
|---|---|---|---|---|
| CN | 111443465 | A | * 7/2020 | ......... G02B 13/0045 |
| CN | 111596442 | A | * 8/2020 | |
| JP | 1993323184 | A | * 12/1993 | |
| JP | 2876252 | B2 | * 1/1999 | |

OTHER PUBLICATIONS

Simon Thibault et al., Consumer Electronic Optics: How Small a Lens can be? The Case of Panomorph Lenses, 9192 Proeceedings of SPIE 91920H-1 to 91920H-7 (2014). (Year: 2014).*

* cited by examiner

Primary Examiner — Cara E Rakowski
Assistant Examiner — Wesley Scott Ashton
(74) Attorney, Agent, or Firm — W&G Law Group

(57) ABSTRACT

Disclosed is a camera optical lens, including nine lenses, and the nine lenses from an object side to an image side are: a first lens with a negative refractive power, a second lens with a positive refractive power, a third lens with a positive refractive power, a fourth lens with a negative refractive power, a fifth lens with a negative refractive power, a sixth lens with a positive refractive power, a seventh lens with a negative refractive power, an eighth lens with a positive refractive power and an ninth lens with a negative refractive power. The camera optical lens satisfies: $-1.60 \leq f1/f \leq -0.50$, $3.00 \leq d13/d14 \leq 15.00$. The camera optical lens has good optical performance, and meets the design requirements of wide-angle and ultra-thin.

10 Claims, 9 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than a charge coupled device (CCD) or a complementary metal-oxide semiconductor sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a structure of a three-piece, four-piece, or even five-piece, or six-piece lens. Also, with the development of technology and the increase of the diverse demands of users, and as the pixel area of photosensitive devices is becoming smaller and smaller and the requirement of the system on the imaging quality is improving constantly, a nine-piece lens structure gradually appears in lens designs. The present nine-piece lens structure generally has good optical performance, however an optical focal length, lens spacing, a lens shape thereof are still arranged unreasonably, so that the nine-piece lens structure cannot meet a design requirements of ultra-thin and wide-angle in the case when the lens structure remains good optical characteristics.

SUMMARY

Some embodiments of this disclosure provide a camera optical lens, comprising nine lenses, the nine lenses from an object side to an image side being: a first lens with a negative refractive power; a second lens with a positive refractive power; a third lens; a fourth lens with a negative refractive power; a fifth lens; a sixth lens with a positive refractive power; a seventh lens with a negative refractive power; an eighth lens with a positive refractive power; and an ninth lens with a negative refractive power; wherein the camera optical lens satisfies following conditions: $-1.60 \leq f1/f \leq -0.50$; $3.00 \leq d13/d14 \leq 15.00$; where, f denotes a focal length of the camera optical lens; f1 denotes a focal length of the first lens; d13 denotes an on-axis thickness of the seventh lens; and d14 denotes an on-axis distance from an image-side surface of the seventh lens to an object-side surface of the eighth lens.

As an improvement, the camera optical lens further satisfies following conditions: $1.80 \leq R9/R10 \leq 7.00$; where R9 denotes a central curvature radius of an object-side surface of the fifth lens; R10 denotes a central curvature radius of an image-side surface of the fifth lens.

As an improvement, the camera optical lens further satisfies following conditions: $0.54 \leq (R1+R2)/(R1-R2) \leq 2.95$; $0.02 \leq d1/TTL \leq 0.13$; where, R1 denotes a central curvature radius of an object-side surface of the first lens; R2 denotes a central curvature radius of an image-side surface of the first lens; d1 denotes an on-axis thickness of the first lens; TTL denotes a total track length of the camera optical lens.

As an improvement, the camera optical lens further satisfies following conditions: $0.22 \leq f2/f \leq 26.16$; $-24.08 \leq (R3+R4)/(R3-R4) \leq 158.15$; $0.02 \leq d3/TTL \leq 0.18$; where f2 denotes a focal length of the second lens; R3 denotes a central curvature radius of an object-side surface of the second lens; R4 denotes a central curvature radius of an image-side surface of the second lens; d3 denotes an on-axis thickness of the second lens; TTL denotes a total track length of the camera optical lens.

As an improvement, the camera optical lens further satisfies following conditions: $-1.82 \leq f3/f \leq 0.72$; $-1.36 \leq (R5+R6)/(R5-R6) \leq 3.51$; $0.02 \leq d5/TTL \leq 0.17$; where f3 denotes a focal length of the third lens; R5 denotes a central curvature radius of an object-side surface of the third lens; R6 denotes a central curvature radius of an image-side surface of the third lens; d5 denotes an on-axis thickness of the third lens; TTL denotes a total track length of the camera optical lens.

As an improvement, the camera optical lens further satisfies following conditions: $-141.78 \leq f4/f \leq -1.56$; $3.43 \leq (R7+R8)/(R7-R8) \leq 12.13$; $0.02 \leq d7/TTL \leq 0.06$; where f4 denotes a focal length of the fourth lens; R7 denotes a central curvature radius of an object-side surface of the fourth lens; R8 denotes a central curvature radius of an image-side surface of the fourth lens; d7 denotes an on-axis thickness of the fourth lens; TTL denotes a total track length of the camera optical lens.

As an improvement, the camera optical lens further satisfies following conditions: $-8.23 \leq f5/f \leq 9.06$; $0.68 \leq (R9+R10)/(R9-R10) \leq 5.01$; $0.02 \leq d9/TTL \leq 0.12$; where f5 denotes a focal length of the fifth lens; R9 denotes a central curvature radius of an object-side surface of the fifth lens; R10 denotes a central curvature radius of an image-side surface of the fifth lens; d9 denotes an on-axis thickness of the fifth lens; TTL denotes a total track length of the camera optical lens.

As an improvement, the camera optical lens further satisfies following conditions: $0.95 \leq f6/f \leq 17.85$; $-1.62 \leq (R11+R12)/(R11-R12) \leq -0.12$; $0.02 \leq d11/TTL \leq 0.11$; where f6 denotes a focal length of the sixth lens; R11 denotes a central curvature radius of an object-side surface of the sixth lens; R12 denotes a central curvature radius of an image-side surface of the sixth lens; d11 denotes an on-axis thickness of the sixth lens; TTL denotes a total track length of the camera optical lens.

As an improvement, the camera optical lens further satisfies following conditions: $-21.65 \leq f7/f \leq -6.01$; $-20.72 \leq (R13+R14)/(R13-R14) \leq -1.88$; $0.02 \leq d13/TTL \leq 0.12$; where f7 denotes a focal length of the seventh lens; R13 denotes a central curvature radius of an object-side surface of the seventh lens; R14 denotes a central curvature radius of an image-side surface of the seventh lens; TTL denotes a total track length of the camera optical lens.

As an improvement, the camera optical lens further satisfies following conditions: $1.07 \leq f8/f \leq 7.01$; $-35.14 \leq (R15+R16)/(R15-R16) \leq -4.28$; $0.03 \leq d15/TTL \leq 0.11$; where f8 denotes a focal length of the eighth lens; R15 denotes a central curvature radius of an object-side surface of the eighth lens; R16 denotes a central curvature radius of an image-side surface of the eighth lens; d15 denotes an on-axis thickness of the eighth lens; TTL denotes a total track length of the camera optical lens.

As an improvement, the camera optical lens further satisfies following conditions: $-1.94 \leq f9/f \leq -0.61$; $0.24 \leq (R17+R18)/(R17-R18) \leq 0.80$; $0.03 \leq d17/TTL \leq 0.09$; where f9 denotes a focal length of the ninth lens; R17 denotes a central curvature radius of an object-side surface of the ninth lens; R18 denotes a central curvature radius of an image-side surface of the ninth lens; d17 denotes an on-axis thickness of the ninth lens; TTL denotes a total track length of the camera optical lens.

BRIEF DESCRIPTION OF DRAWINGS

In order to make more clearly technical solutions of embodiments in the present disclosure, accompanying drawings, which are used in the description of the embodiments, will be described briefly in the following. Obviously, the accompanying drawings in the following description are only some examples of the present disclosure. Those skilled in the art, without creative work, may obtain other drawings based on these drawings.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

First Embodiment

Figure 1:
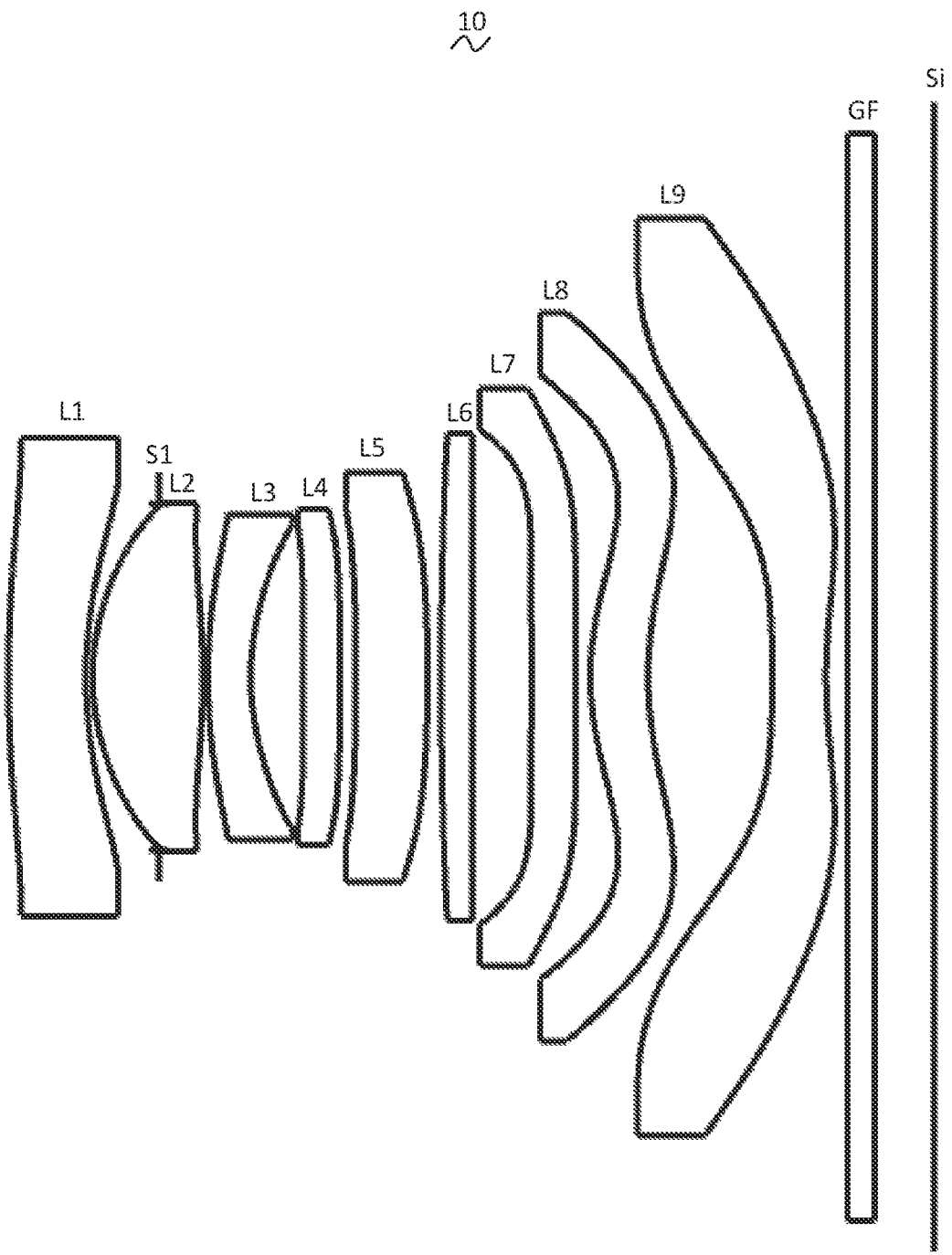
FIG. 1 is a schematic diagram of a structure of a camera optical lens according to a first embodiment of the present disclosure.

Referring to the accompanying drawings, the present disclosure provides a camera optical lens 10. FIG. 1 shows the camera optical lens 10 of the first embodiment of the present disclosure, and the camera optical lens 10 includes nine lenses. Specifically, the camera optical lens 10 includes, from an object side to an image side: a first lens L1, an aperture S1, a second lens L2, a third lens L3, a fourth lens L4, a fifth lens L5, a sixth lens L6, a seventh lens L7, an eighth lens L8 and an ninth lens L9. An optical element, such as an optical filter GF, may be arranged between the ninth lens L9 and an image surface Si.

In this embodiment, the first lens L1 has a negative refractive power, the second lens L2 has a positive refractive power, the third lens L3 has a negative refractive power, the fourth lens L4 has a negative refractive power, the fifth lens L5 has a positive refractive power, the sixth lens L6 has a positive refractive power, the seventh lens L7 has a negative refractive power, the eighth lens L8 has a positive refractive power, and the ninth lens L9 has a negative refractive power. It can be understood that, in other embodiments, the first lens L1, the third lens L3, the fourth lens L4, the fifth lens L5, the sixth lens L6, the seventh lens L7, the eighth lens L8, and the ninth lens L9 may also have other refractive powers. In this embodiment, the second lens L2 has a positive refractive power, conducing to improve the performance of the optical system.

In this embodiment, the first lens L1, the second lens L2, the third lens L3, the fourth lens L4, the fifth lens L5, the sixth lens L6, the seventh lens L7, the eighth lens L8, and the ninth lens L9 are all made of plastic material. In other embodiments, the lenses may also be made of other materials.

In this embodiment, a focal length of the camera optical lens 10 is defined as f, and a focal length of the first lens L1 is defined as f1. The camera optical lens 10 satisfies a condition of $-1.60 \leq f1/f \leq -0.50$, which specifies a ratio between the focal length f1 of the first lens L1 and the focal length f of the camera optical lens 10, effectively balancing spherical aberration and field curvature amount of the camera optical lens 10 in this range.

An on-axis thickness of the seventh lens L7 is defined as d13, an on-axis distance from an image-side surface of the seventh lens L7 to an object-side surface of the eighth lens L8 is defined as d14, and the camera optical lens 10 further satisfies a condition of $3.00 \leq d13/d14 \leq 15.00$, which specifies a ratio between the on-axis thickness d13 of the seventh lens L7 and an on-axis distance d14 from an image-side surface of the seventh lens L7 to an object-side surface of the eighth lens L8, conducing to compress the total track length and achieve an ultra-thin effect in this range. Preferably, the camera optical lens 10 further satisfies a condition of $3.11 \leq d13/d14 \leq 14.71$. A central curvature radius of an object-side surface of the fifth lens L5 is defined as R9, a central curvature radius of an image-side surface of the fifth lens L5 is defined as R10, and the camera optical lens 10 further satisfies a condition of $1.80 \leq R9/R10 \leq 7.00$, which specifies a shape of the fifth lens L5. Within this range, the deflection of light passing through the lens can be eased and aberrations can be effectively reduced.

In this embodiment, the object-side surface of the first lens L1 is convex in a paraxial region, and the image-side surface of the first lens L1 is concave in the paraxial region.

A central curvature radius of the object-side surface of the first lens L1 is defined as R1, a central curvature radius of the image-side surface of the first lens L1 is defined as R2, and the camera optical lens satisfies a condition of $0.54 \leq (R1+R2)/(R1-R2) \leq 2.95$, which reasonably controls a shape of the first lens L1, so that the first lens L1 can effectively correct system spherical aberration. Preferably, the camera optical lens 10 satisfies a condition of $0.86 \leq (R1+R2)/(R1-R2) \leq 2.36$.

An on-axis thickness of the first lens L1 is defined as d1, a total track length of the camera optical lens 10 is defined as TTL, and the camera optical lens 10 further satisfies a condition of $0.02 \leq d1/TTL \leq 0.13$, conducing to realize an ultra-thin effect in this range. Preferably, the camera optical lens 10 further satisfies a condition of $0.03 \leq d1/TTL \leq 0.10$.

In this embodiment, an object-side surface of the second lens L2 is convex in the paraxial region, and an image-side surface of the second lens L2 is convex in the paraxial region.

The focal length of the camera optical lens 10 is defined as f, a focal length of the second lens L2 is defined as f2, and the camera optical lens 10 further satisfies a condition of $0.22 \leq f2/f \leq 26.16$. In this way, a positive refractive power of the second lens L2 is controlled within a reasonable range, so that it is beneficial to correct the aberration of the optical system. Preferably, the camera optical lens 10 further satisfies a condition of $0.35 \leq f2/f \leq 20.93$.

A central curvature radius of the object-side surface of the second lens L2 is defined as R3, a central curvature radius of the image-side surface of the second lens L2 is defined as R4, and the camera optical lens 10 further satisfies a condition of $-24.08 \leq (R3+R4)/(R3-R4) \leq 158.15$, which specifies a shape of the second lens L2. Within this range, a development towards ultra-thin and wide-angle lenses would facilitate correcting the problem of an on-axis aberration. Preferably, the camera optical lens 10 further satisfies a condition of $-15.05 \leq (R3+R4)/(R3-R4) \leq 126.52$.

A total track length of the camera optical lens 10 is defined as TTL, an on-axis thickness of the second lens L2 is defined as d3, and the camera optical lens 10 satisfies a condition of $0.02 \leq d3/TTL \leq 0.18$. Within this range, it is beneficial to achieve ultra-thin lenses. Preferably, the camera optical lens 10 further satisfies a condition of $0.03 \leq d3/TTL \leq 0.14$.

In an embodiment, an object-side surface of the third lens L3 is convex in the paraxial region, and an image-side surface of the third lens L3 is concave in the paraxial region.

The focal length of the camera optical lens 10 is defined as f, a focal length of the third lens L3 is defined as f3, and the camera optical lens 10 further satisfies a condition of $-1.82 \leq f3/f \leq 0.72$. In this way, a refractive power is distributed appropriately, so that the camera optical lens can attain a better imaging quality and a lower sensitivity. Preferably, the camera optical lens 10 further satisfies a condition of $-1.14 \leq f3/f \leq 0.57$.

A central curvature radius of the object-side surface of the third lens L3 is defined as R5, a central curvature radius of the image-side surface of the third lens L3 is defined as R6, and the camera optical lens 10 further satisfies a condition of $-1.36 \leq (R5+R6)/(R5-R6) \leq 3.51$, which specifies a shape of the third lens L3. Within this range, the deflection of light passing through the lens can be eased and aberrations can be effectively reduced. Preferably, the camera optical lens 10 further satisfies a condition of $-0.85 \leq (R5+R6)/(R5-R6) \leq 2.81$.

The total track length of the camera optical lens 10 is defined as TTL, an on-axis thickness of the third lens L3 is defined as d5, and the camera optical lens 10 further satisfies a condition of $0.02 \leq d5/TTL \leq 0.17$. This can facilitate achieving ultra-thin lenses. Preferably, the camera optical lens 10 further satisfies a condition of $0.04 \leq d5/TTL \leq 0.14$.

In an embodiment, an object-side surface of the fourth lens L4 is convex in the paraxial region, and an image-side surface of the fourth lens L4 is concave in the paraxial region.

The focal length of the camera optical lens 10 is defined as f, a focal length of the fourth lens L4 is defined as f4, and the camera optical lens 10 further satisfies a condition of $-141.78 \leq f4/f \leq -1.56$. In this way, a refractive power is distributed appropriately, so that the camera optical lens can attain a better imaging quality and a lower sensitivity. Preferably, the camera optical lens 10 further satisfies a condition of $-88.61 \leq f4/f \leq -1.96$.

A central curvature radius of an object-side surface of the fourth lens L4 is defined as R7, a central curvature radius of an image-side surface of the fourth lens L4 is defined as R8, and the camera optical lens 10 further satisfies a condition of $3.43 \leq (R7+R8)/(R7-R8) \leq 12.13$, which specifies a shape of the fourth lens L4. Within this range, a development towards ultra-thin and wide-angle lens would facilitate correcting problems such as an off-axis aberration. Preferably, the camera optical lens 10 further satisfies a condition of $5.48 \leq (R7+R8)/(R7-R8) \leq 9.70$.

The total track length of the camera optical lens 10 is defined as TTL, an on-axis thickness of the fourth lens L4 is defined as d7, and the camera optical lens 10 further satisfies a condition of $0.02 \leq d7/TTL \leq 0.06$. Within this range, this can facilitate achieving ultra-thin lenses. Preferably, the camera optical lens 10 further satisfies a condition of $0.03 \leq d7/TTL \leq 0.05$.

In an embodiment, an object-side surface of the fifth lens L5 is concave in the paraxial region, and an image-side surface of the fifth lens L5 is convex in the paraxial region.

The focal length of the camera optical lens 10 is defined as f, a focal length of the fifth lens L5 is defined as f5, and the camera optical lens 10 further satisfies a condition of $-8.23 \leq f5/f \leq 9.06$, which can effectively make a light angle of the camera optical lens 10 gentle and reduce a tolerance sensitivity. Preferably, the camera optical lens 10 further satisfies a condition of $-5.15 \leq f5/f \leq 7.24$.

A central curvature radius of the object-side surface of the fifth lens L5 is defined as R9, a central curvature radius of the image-side surface of the fifth lens L5 is defined as R10, and the camera optical lens 10 further satisfies a condition of $0.68 \leq (R9+R10)/(R9-R10) \leq 5.01$, which specifies a shape of the fifth lens L5. Within this range, a development towards ultra-thin and wide-angle lenses can facilitate correcting a problem of the off-axis aberration. Preferably, the camera optical lens 10 further satisfies a condition of $1.08 \leq (R9+R10)/(R9-R10) \leq 4.01$.

The total track length of the camera optical lens 10 is defined as TTL, an on-axis thickness of the fifth lens L5 is defined as d9, and the camera optical lens 10 further satisfies a condition of $0.02 \leq d9/TTL \leq 0.12$. Within this range, this can facilitate achieving ultra-thin lenses. Preferably, the camera optical lens 10 further satisfies a condition of $0.03 \leq d9/TTL \leq 0.09$.

In an embodiment, an object-side surface of the sixth lens L6 is convex in the paraxial region, and an image-side surface of the sixth lens L6 is convex in the paraxial region.

A focal length of the camera optical lens 10 is defined as f, a focal length of the sixth lens L6 is defined as f6, and the camera optical lens satisfies a condition of $0.95 \leq f6/f \leq 17.85$. In this way, a refractive power is distributed appropriately, so that the system can attain a better imaging quality and a lower sensitivity. Preferably, the camera optical lens 10 further satisfies a condition of $1.52 \leq f6/f \leq 14.28$.

A central curvature radius of the object-side surface of the sixth lens L6 is defined as R11, a central curvature radius of the image-side surface of the sixth lens L6 is defined as R12, and the camera optical lens 10 further satisfies a condition of $-1.62 \leq (R11+R12)/(R11-R12) \leq -0.12$, which specifies a shape of the sixth lens L6. Within this range, a development towards ultra-thin and wide-angle lenses would facilitate correcting a problem like the off-axis aberration. Preferably, the camera optical lens 10 further satisfies a condition of −1.01≤(R11+R12)/(R11−R12)≤−0.15.

The total track length of the camera optical lens 10 is defined as TTL, an on-axis thickness of the sixth lens L6 is defined as d11, and the camera optical lens 10 further satisfies a condition of 0.02≤d11/TTL≤0.11. Within this range, this can facilitate achieving ultra-thin lenses. Preferably, the camera optical lens 10 further satisfies a condition of 0.03≤d11/TTL≤0.09.

In an embodiment, an object-side surface of the seventh lens L7 is concave in the paraxial region, and an image-side surface of the seventh lens L7 is convex in the paraxial region.

The focal length of the camera optical lens 10 is defined as f, a focal length of seventh lens L7 is defined as f7, and the camera optical lens 10 further satisfies a condition of −21.65≤f7/f≤−6.01. Within this range, a refractive power is distributed appropriately, so that the system can attain the better imaging quality and lower sensitivity. Preferably, the camera optical lens 10 further satisfies a condition of −13.53≤f7/f≤−7.52.

A central curvature radius of the object-side surface of the seventh lens L7 is defined as R13, a central curvature radius of the image-side surface of the seventh lens L7 is defined as R14, and the camera optical lens 10 further satisfies a condition of −20.72≤(R13+R14)/(R13−R14)≤−1.88, which specifies a shape of the seventh lens L7. Within this specified range, the deflection of light passing through the lens can be eased and aberrations can be effectively reduced. Preferably, the camera optical lens 10 further satisfies a condition of −12.95≤(R13+R14)/(R13−R14)≤−2.34.

The total track length of the camera optical lens 10 is defined as TTL, an on-axis thickness of the seventh lens L7 is defined as d13, and the camera optical lens 10 further satisfies a condition of 0.02≤d13/TTL≤0.12. Within this range, it is beneficial to achieve ultra-thin lenses. Preferably, the camera optical lens 10 further satisfies a condition of 0.04≤d13/TTL≤0.09.

In an embodiment, an object-side surface of the eighth lens L8 is convex in the paraxial region, and an image-side surface of eighth lens L8 is concave in the paraxial region.

The focal length of the camera optical lens 10 is defined as f, a focal length of eighth lens L8 is defined as f8, and the camera optical lens 10 further satisfies a condition of 1.07≤f8/f≤7.01. In this way, a refractive power is distributed appropriately, so that the camera optical lens can attain a better imaging quality and a lower sensitivity. Preferably, the camera optical lens 10 further satisfies a condition of 1.71≤f8/f≤5.61.

A central curvature radius of the object-side surface of the eighth lens L8 is defined as R15, a central curvature radius of the image-side surface of the sixth lens L8 is defined as R16, and the camera optical lens 10 further satisfies a condition of −35.14≤(R15+R16)/(R15−R16)≤−4.28, which specifies a shape of the eighth lens L8. Within this range, a development towards ultra-thin and wide-angle lenses would facilitate correcting a problem like the off-axis aberration. Preferably, the camera optical lens 10 further satisfies a condition of −21.96≤(R15+R16)/(R15−R16)≤−5.35.

The total track length of the camera optical lens 10 is defined as TTL, an on-axis thickness of the eighth lens L8 is defined as d15, and the camera optical lens 10 further satisfies a condition of 0.03≤d15/TTL≤0.11. Within this range, this can facilitate achieving ultra-thin lenses. Preferably, the camera optical lens 10 further satisfies a condition of 0.04≤d15/TTL≤0.09.

In an embodiment, an object-side surface of the ninth lens L9 is concave in the paraxial region, and an image-side surface of ninth lens L9 is concave in the paraxial region.

The focal length of the camera optical lens 10 is defined as f, a focal length of the ninth lens L9 is defined as f9, and the camera optical lens 10 further satisfies a condition of −1.94≤f9/f≤−0.61. In this way, a refractive power is distributed appropriately, so that the camera optical lens can attain a better imaging quality and a lower sensitivity. Preferably, the camera optical lens 10 further satisfies a condition of −1.22≤f9/f≤−0.76.

A central curvature radius of the object-side surface of the ninth lens L9 is defined as R17, a central curvature radius of the image-side surface of the ninth lens L9 is defined as R18, and the camera optical lens 10 further satisfies a condition of 0.24≤(R17+R18)/(R17−R18)≤0.80, which specifies a shape of the ninth lens L9. Within this range, a development towards ultra-thin and wide-angle lenses would facilitate correcting a problem like the off-axis aberration. Preferably, the camera optical lens 10 further satisfies a condition of 0.39≤(R17+R18)/(R17−R18)≤0.64.

The total track length of the camera optical lens 10 is defined as TTL, an on-axis thickness of the ninth lens L9 is defined as d17, and the camera optical lens 10 further satisfies a condition of 0.03≤d17/TTL≤0.09. Within this range, this can facilitate achieving ultra-thin lenses. Preferably, the camera optical lens 10 further satisfies a condition of 0.04≤d17/TTL≤0.07.

In an embodiment, an image height of the camera optical lens 10 is defined as IH, the total track length of the camera optical lens 10 is defined as TTL, and the camera optical lens 10 further satisfies a condition of TTL/IH≤1.67, thus facilitating to achieve ultra-thin lenses.

In an embodiment, an FOV (field of view) of the camera optical lens 10 is greater than or equal to 75.00°, thereby achieving a wide-angle and a better imaging performance of the camera optical lens 10.

It can be understood that, in other embodiments, for the first lens L1, the second lens L2, the third lens L3, the fourth lens L4, the fifth lens L5, the sixth lens L6, the seventh lens L7, the eighth lens L8, and the ninth lens L9, surface profiles of an object-side surface and an image-side surface respectively may be configured in other convex or concave arrangements.

When the above condition is satisfied, the camera optical lens 10 can meet the design requirements of wide-angle and ultra-thin in the case that a good optical performance is maintained. According to characteristics of the camera optical lens 10, the camera optical lens 10 is particularly suitable for mobile phone camera lens components and WEB camera lenses composed of camera elements such as CCD and CMOS with high pixel.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL refers to a total track length (an on-axis distance from an object-side surface of the first lens L1 to an image surface Si) in units of mm.

Aperture value FNO refers to a ratio of an effective focal length of the camera optical lens to an entrance pupil diameter.

Preferably, inflexion points and/or arrest points can be arranged on the object-side surface and/or the image-side surface of the lens, so as to satisfy the demand for high quality imaging. The description below may be referred for specific implementations.

The design data of the camera optical lens 10 in the first embodiment of the present disclosure are shown in Table 1 and Table 2.

TABLE 1

|  | R | d |  | nd |  | vd |
|---|---|---|---|---|---|---|
| S1 | ∞ | d0= | −1.187 |  |  |  |
| R1 | 9.680 | d1= | 0.610 | nd1 | 1.5444 | v1 | 55.82 |
| R2 | 3.148 | d2= | 0.055 |  |  |  |
| R3 | 1.828 | d3= | 0.869 | nd2 | 1.5444 | v2 | 55.82 |
| R4 | −4.493 | d4= | 0.040 |  |  |  |
| R5 | 5.034 | d5= | 0.336 | nd3 | 1.6700 | v3 | 19.39 |
| R6 | 2.019 | d6= | 0.415 |  |  |  |
| R7 | 77.055 | d7= | 0.283 | nd4 | 1.6700 | v4 | 19.39 |
| R8 | 60.089 | d8= | 0.126 |  |  |  |
| R9 | −105.217 | d9= | 0.568 | nd5 | 1.5346 | v5 | 55.70 |
| R10 | −15.807 | d10= | 0.106 |  |  |  |
| R11 | 42.248 | d11= | 0.250 | nd6 | 1.5346 | v6 | 55.70 |
| R12 | −272.778 | d12= | 0.465 |  |  |  |
| R13 | −15.83 | d13= | 0.350 | nd7 | 1.5844 | v7 | 28.22 |
| R14 | −33.289 | d14= | 0.109 |  |  |  |
| R15 | 2.128 | d15= | 0.456 | nd8 | 1.5346 | v8 | 55.70 |
| R16 | 2.913 | d16= | 0.979 |  |  |  |
| R17 | −11.734 | d17= | 0.422 | nd9 | 1.5346 | v9 | 55.70 |
| R18 | 3.76 | d18= | 0.173 |  |  |  |
| R19 | ∞ | d19= | 0.210 | ndg | 1.5168 | vg | 64.17 |
| R20 | ∞ | d20= | 0.470 |  |  |  |

In the table, meanings of various symbols will be described as follows:

S1: aperture;

R: curvature radius at a center of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of the object-side surface of the eighth lens L8;

R16: central curvature radius of the image-side surface of the eighth lens L8;

R17: central curvature radius of the object-side surface of the ninth lens L9;

R18: central curvature radius of the image-side surface of the ninth lens L9;

R19: central curvature radius of an object-side surface of the optical filter GF;

R20: central curvature radius of an image-side surface of the optical filter GF;

d: on-axis thickness of a lens, or an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the eighth lens L8;

d15: on-axis thickness of the seventh lens L8;

d16: on-axis distance from the image-side surface of the eighth lens L8 to the object-side surface of the ninth lens L9;

d17: on-axis thickness of the ninth lens L9;

d18: on-axis distance from the image-side surface of the ninth lens L9 to the object-side surface of the optical filter GF;

d19: on-axis thickness of the optical filter GF;

d20: on-axis distance from the image-side surface of the optical filter GF to the image surface Si;

nd: refractive index of a d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

nd8: refractive index of the d line of the eighth lens L8;

nd9: refractive index of the d line of the ninth lens L9;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;
v8: abbe number of the eighth lens L8;
v9: abbe number of the ninth lens L9;
vg: abbe number of the optical filter GF.

Table 2 shows aspherical surface data of the camera optical lens 10 in the first embodiment of the present disclosure.

TABLE 2

| | Conic coefficient | Aspheric surface coefficients | | | | |
|---|---|---|---|---|---|---|
| | k | A4 | A6 | A8 | A10 | A12 |
| R1  | −4.3621E+01 | 2.9517E−03 | −3.7602E−03 | 2.1918E−03 | −1.1074E−03 | 3.1816E−04 |
| R2  | −8.2008E+00 | −2.4161E−02 | 4.7748E−02 | −4.4824E−02 | 2.6739E−02 | −1.0486E−02 |
| R3  | −2.9289E−01 | −5.2952E−02 | 6.4731E−02 | −6.8966E−02 | 8.1123E−02 | −9.0457E−02 |
| R4  | −9.5571E+01 | 1.1408E−02 | −1.6676E−02 | 3.7965E−02 | −3.7995E−02 | 2.3038E−02 |
| R5  | 1.0684E+00 | 3.7139E−02 | −1.1927E−01 | 2.1787E−01 | −2.4655E−01 | 1.6714E−01 |
| R6  | −3.1120E+00 | −4.2699E−02 | 1.0699E−01 | −1.3525E−01 | 1.3412E−01 | −8.7489E−02 |
| R7  | 9.8902E+01 | −4.1109E−02 | 3.9462E−02 | −6.6542E−02 | 9.9155E−02 | −1.0433E−01 |
| R8  | 9.9000E+01 | −5.1942E−02 | 3.6820E−02 | −2.4037E−02 | 1.6653E−02 | −2.4371E−02 |
| R9  | 3.3414E+03 | −4.0997E−02 | 2.8322E−02 | −2.5462E−02 | 4.1428E−02 | −4.7643E−02 |
| R10 | 4.8538E+01 | −1.8148E−02 | −6.1477E−03 | 8.6752E−03 | −5.8299E−03 | 3.8651E−03 |
| R11 | 2.1950E+02 | 0.0000E+00 | 0.0000E+00 | 0.0000E+00 | 0.0000E+00 | 0.0000E+00 |
| R12 | −9.2365E+03 | 0.0000E+00 | 0.0000E+00 | 0.0000E+00 | 0.0000E+00 | 0.0000E+00 |
| R13 | −8.0306E+00 | 6.4680E−02 | −5.9088E−02 | 2.7748E−02 | −1.0720E−02 | 2.9127E−03 |
| R14 | −2.6341E+03 | 1.8692E−02 | −2.8848E−02 | 1.8734E−02 | −1.0809E−02 | 4.5344E−03 |
| R15 | −3.0007E+00 | −3.3737E−02 | −1.3153E−02 | 4.6913E−03 | 1.4512E−03 | −1.9981E−03 |
| R16 | −1.2605E+01 | 4.8936E−02 | −6.7872E−02 | 3.5922E−02 | −1.2599E−02 | 2.9680E−03 |
| R17 | 5.9781E+00 | −7.6048E−02 | 1.4808E−02 | −4.0174E−02 | −2.0649E−04 | 3.6983E−05 |
| R18 | −1.2013E−01 | −8.6110E−02 | 2.1760E−02 | −5.0256E−03 | 1.0053E−03 | −1.4801E−04 |

| | Conic coefficient | Aspheric surface coefficients | | | |
|---|---|---|---|---|---|
| | k | A14 | A16 | A18 | A20 |
| R1  | −4.3621E+01 | −5.0696E−05 | 3.5015E−06 | 0.0000E+00 | 0.0000E+00 |
| R2  | −8.2008E+00 | 2.2238E−03 | −1.8816E−04 | 0.0000E+00 | 0.0000E+00 |
| R3  | −2.9289E−01 | 7.6326E−02 | −4.1082E−02 | 1.2377E−02 | −1.5933E−03 |
| R4  | −9.5571E+01 | −7.0622E−03 | 6.6913E−04 | 0.0000E+00 | 0.0000E+00 |
| R5  | 1.0684E+00 | −6.2391E−02 | 9.6329E−03 | 0.0000E+00 | 0.0000E+00 |
| R6  | −3.1120E+00 | 3.3494E−02 | −5.6986E−03 | 0.0000E+00 | 0.0000E+00 |
| R7  | 9.8902E+01 | 5.7966E−02 | −1.2481E−02 | 0.0000E+00 | 0.0000E+00 |
| R8  | 9.9000E+01 | 1.5314E−02 | −2.8831E−03 | 0.0000E+00 | 0.0000E+00 |
| R9  | 3.3414E+03 | 2.3882E−02 | −4.1260E−03 | 0.0000E+00 | 0.0000E+00 |
| R10 | 4.8538E+01 | −2.3012E−03 | 7.7071E−04 | −9.7124E−05 | 0.0000E+00 |
| R11 | 2.1950E+02 | 0.0000E+00 | 0.0000E+00 | 0.0000E+00 | 0.0000E+00 |
| R12 | −9.2365E+03 | 0.0000E+00 | 0.0000E+00 | 0.0000E+00 | 0.0000E+00 |
| R13 | −8.0306E+00 | −5.3240E−04 | 5.4807E−05 | −2.1323E−06 | 0.0000E+00 |
| R14 | −2.6341E+03 | −1.2874E−03 | 2.3420E−04 | −2.4188E−05 | 1.0603E−06 |
| R15 | −3.0007E+00 | 8.1836E−04 | −1.7270E−04 | 1.9000E−05 | −8.6184E−07 |
| R16 | −1.2605E+01 | −4.5955E−04 | 4.4634E−05 | −2.4520E−06 | 5.7809E−08 |
| R17 | 5.9781E+00 | −3.4185E−06 | 2.0015E−07 | −7.0066E−09 | 1.0973E−10 |
| R18 | −1.2013E−01 | 1.4346E−05 | −8.5752E−07 | 2.8678E−08 | −4.1191E−10 |

Here, K is a conic coefficient, and A4, A6, A8, A10, A12, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

Here, x denotes a vertical distance between a point on an aspheric curve and an optical axis, and y denotes a depth of a aspheric surface (i.e. a vertical distance between a point on an aspheric surface that is x away from the optical axis, and a tangent plane tangent to an vertex of the optical axis on the aspheric surface).

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to the first embodiment of the present disclosure. P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5, P6R1 and P6R2 respectively represent the object-side surface and the image-side surface of the sixth lens L6, P7R1 and P7R2 respectively represent the object-side surface and the image-side surface of the seventh lens L7. P8R1 and P8R2 respectively represent the object-side surface and the image-side surface of the eighth lens L8, P9R1 and P9R2 respectively represent the object-side surface and the image-side surface of the ninth lens L9. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 |
|---|---|---|---|
| P1R1 | 1 | 1.175 | / |
| P1R2 | 1 | 1.185 | / |
| P2R1 | 0 | / | / |
| P2R2 | 2 | 0.625 | 1.255 |
| P3R1 | 1 | 1.085 | / |
| P3R2 | 0 | / | / |
| P4R1 | 1 | 0.175 | / |
| P4R2 | 2 | 0.175 | 1.215 |
| P5R1 | 1 | 1.225 | / |
| P5R2 | 1 | 1.485 | / |
| P6R1 | 0 | / | / |
| P6R2 | 0 | / | / |
| P7R1 | 2 | 0.325 | 0.785 |
| P7R2 | 2 | 0.435 | 0.515 |
| P8R1 | 1 | 0.785 | / |
| P8R2 | 1 | 0.855 | / |
| P9R1 | 2 | 1.835 | 3.415 |
| P9R2 | 1 | 0.575 | / |

TABLE 4

| | Number(s) of arrest points | Arrest point position 1 | Arrest point position 2 |
|---|---|---|---|
| P1R1 | 1 | 1.775 | / |
| P1R2 | 0 | / | / |
| P2R1 | 0 | / | / |
| P2R2 | 1 | 1.125 | / |
| P3R1 | 0 | / | / |
| P3R2 | 0 | / | / |
| P4R1 | 1 | 0.295 | / |
| P4R2 | 1 | 0.295 | / |
| P5R1 | 0 | / | / |
| P5R2 | 0 | / | / |
| P6R1 | 0 | / | / |
| P6R2 | 0 | / | / |
| P7R1 | 2 | 0.705 | 0.845 |
| P7R2 | 0 | / | / |
| P8R1 | 1 | 1.385 | / |
| P8R2 | 1 | 1.485 | / |
| P9R1 | 2 | 3.315 | 3.485 |
| P9R2 | 1 | 1.095 | / |

Figure 2:
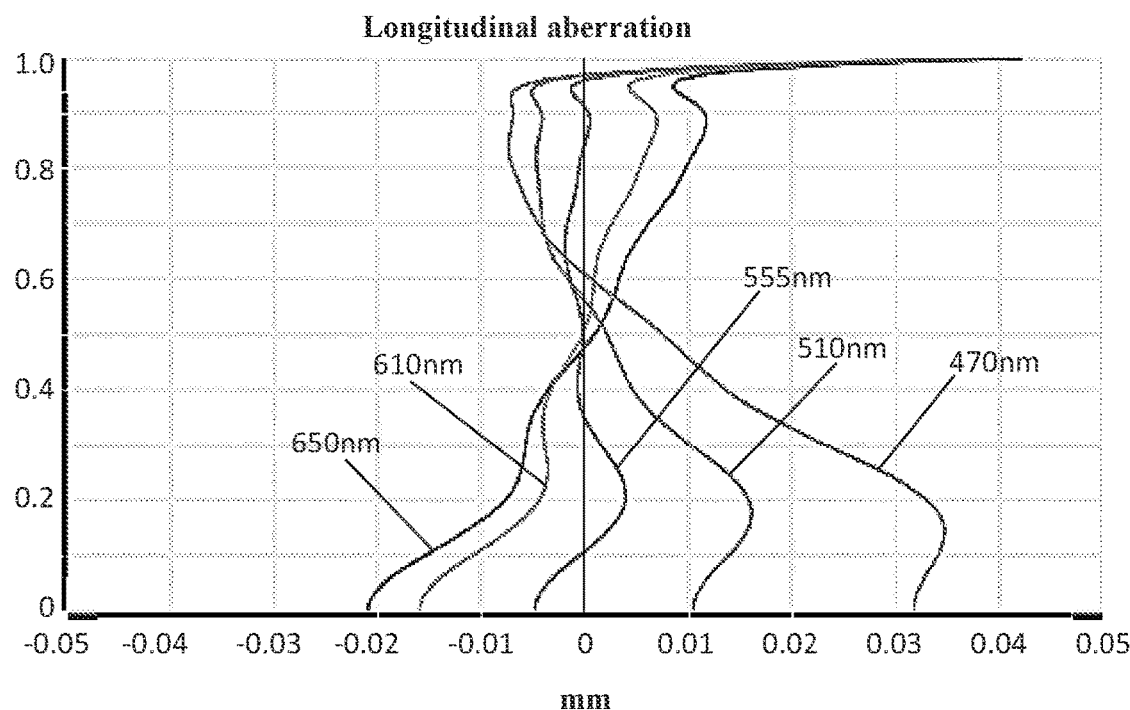
FIG. 2 is a schematic diagram of a longitudinal aberration of the camera optical lens shown in FIG. 1.
Figure 3:
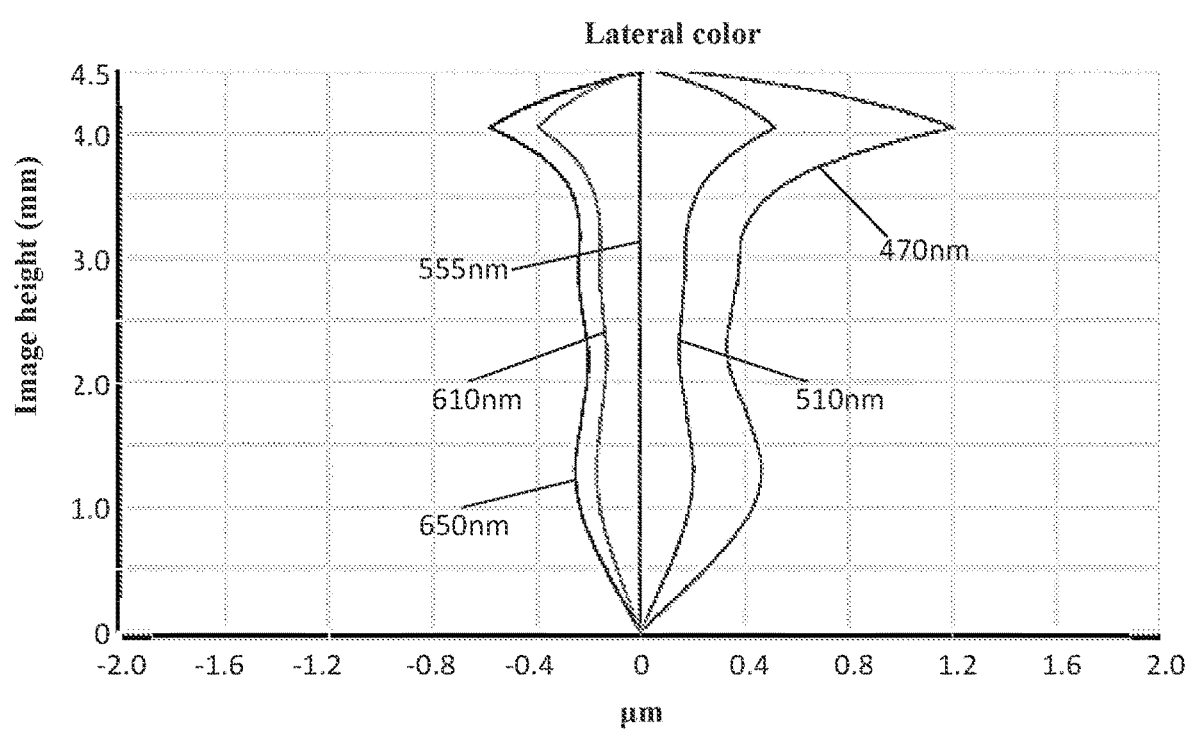
FIG. 3 is a schematic diagram of a lateral color of the camera optical lens shown in FIG. 1.
Figure 4:
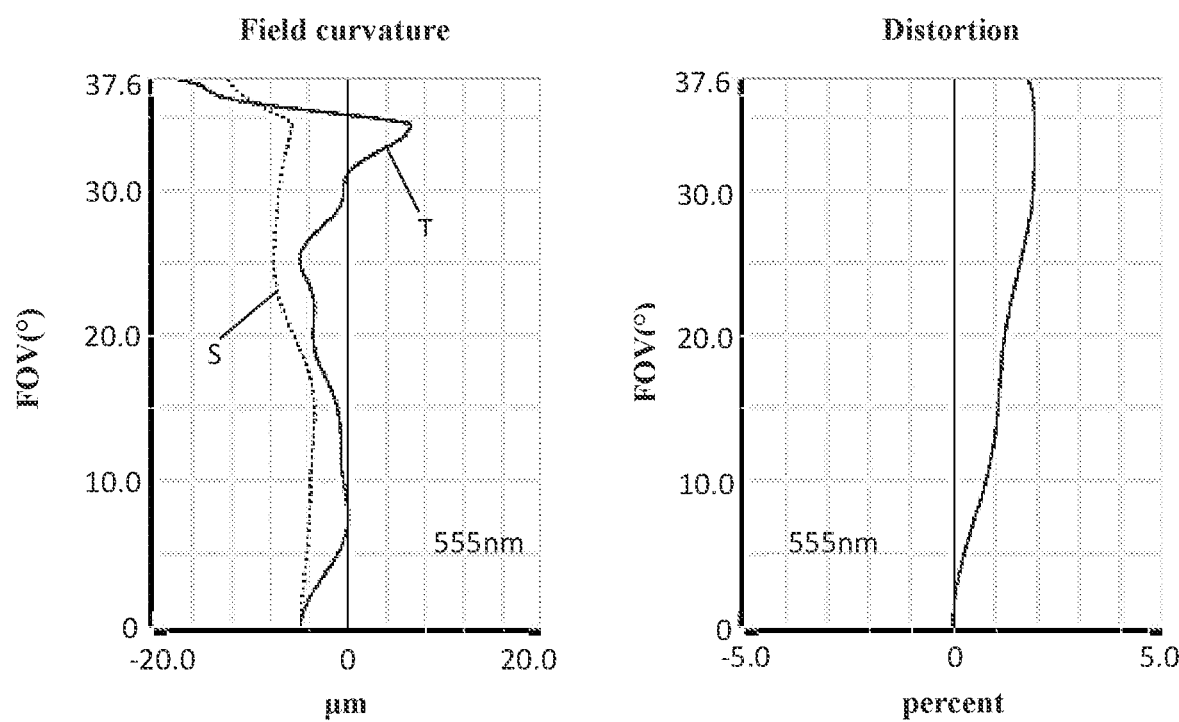
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm and 470 nm after passing the camera optical lens 10 according to the first embodiment, respectively. FIG. 4 illustrates a field curvature and a distortion of light with a wavelength of 555 nm after passing the camera optical lens 10 according to the first embodiment. In FIG. 4, a field curvature S is a field curvature in a sagittal direction, and T is a field curvature in a meridional direction.

Table 13 in the following shows various values of first, second and third embodiments and values corresponding to parameters which are specified in the above conditions.

As shown in Table 13, the first embodiment satisfies the above conditions.

In this Embodiment, an entrance pupil diameter (ENPD) of the camera optical lens is 2.515 mm, an image height (IH) of 1.0H is 4.500 mm, a field of view (FOV) in a diagonal direction is 75.19°. Thus, the camera optical lens meets the design requirements of wide-angle and ultra-thin. Its on-axis and off-axis aberrations are fully corrected, thereby achieving excellent optical characteristics.

Second Embodiment

Figure 5:
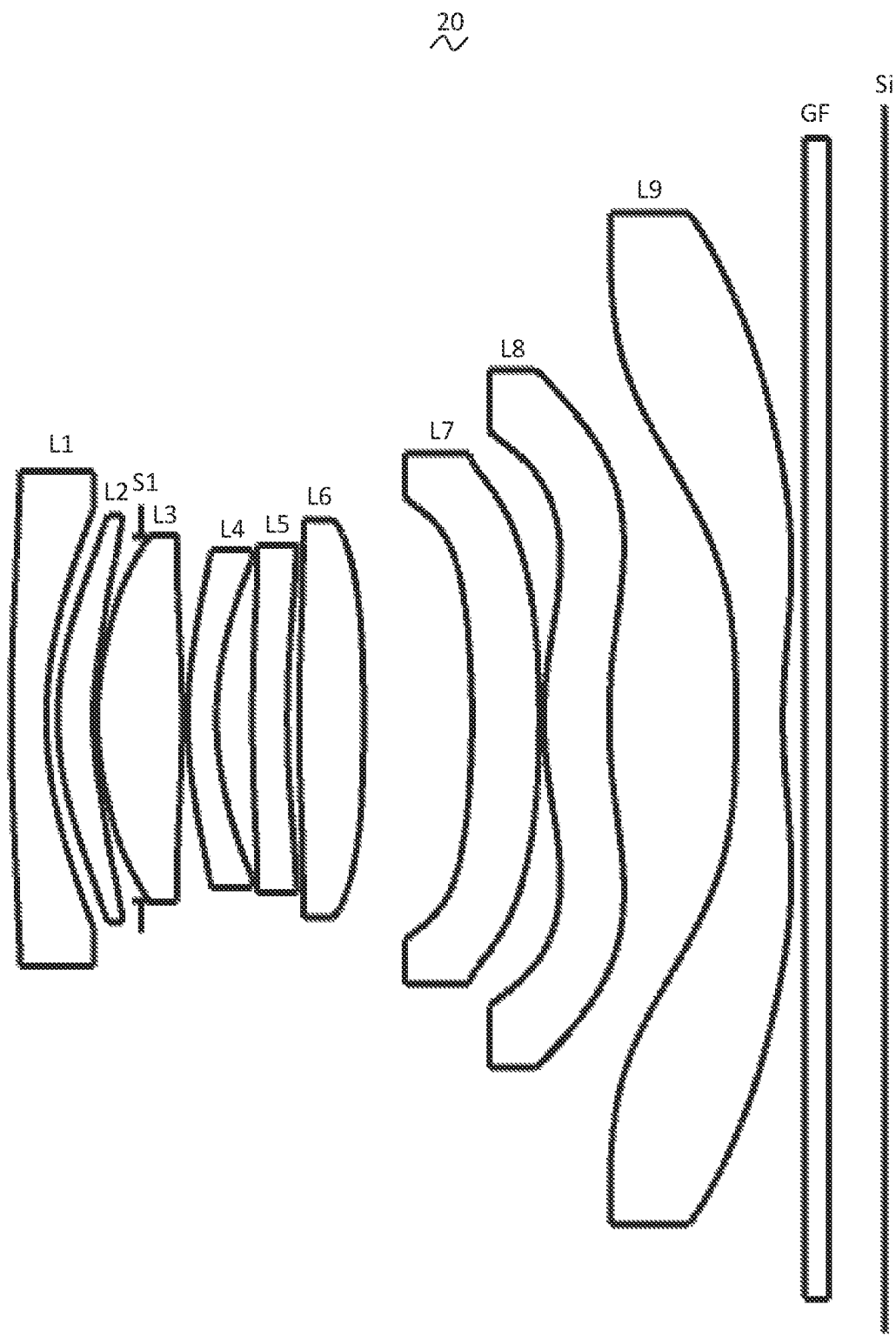
FIG. 5 is a schematic diagram of a structure of a camera optical lens according to a second embodiment of the present disclosure.

FIG. 5 shows a camera optical lens 20 of the second embodiment of the present disclosure, the second embodiment is basically the same as the first embodiment and involves symbols having the same meanings as the first embodiment, and only differences therebetween will be described in the following.

The camera optical lens 20 includes, from an object side to an image side: a first lens L1, a second lens L2, an aperture S1, a third lens L3, a fourth lens L4, a fifth lens L5, a sixth lens L6, a seventh lens L7, an eighth lens L8 and an ninth lens L9. The third lens L3 has a positive refractive power and the fifth lens L5 has a negative refractive power. The image-side surface of the second lens L2 is concave in the paraxial region, the image-side surface of the third lens L3 is convex in the paraxial region, the object-side surface of the fifth lens L5 is convex in the paraxial region, and the image-side surface of the fifth lens L5 is concave in the paraxial region.

Table 5 and Table 6 show design data of the camera optical lens 20 in the second embodiment of the present disclosure.

TABLE 5

| | R | d | | nd | | vd |
|---|---|---|---|---|---|---|
| S1 | ∞ | d0= | −1.120 | | | |
| R1 | 14.192 | d1= | 0.300 | nd1 | 1.5444 | v1 | 55.82 |
| R2 | 2.567 | d2= | 0.100 | | | |
| R3 | 1.969 | d3= | 0.300 | nd2 | 1.5444 | v2 | 55.82 |
| R4 | 1.932 | d4= | 0.035 | | | |
| R5 | 1.740 | d5= | 0.732 | nd3 | 1.5444 | v3 | 55.82 |
| R6 | −9.181 | d6= | 0.047 | | | |
| R7 | 2.617 | d7= | 0.247 | nd4 | 1.6700 | v4 | 19.39 |
| R8 | 1.955 | d8= | 0.309 | | | |
| R9 | 13.380 | d9= | 0.300 | nd5 | 1.6700 | v5 | 19.39 |
| R10 | 7.213 | d10= | 0.100 | | | |
| R11 | 9.995 | d11= | 0.554 | nd6 | 1.5346 | v6 | 55.70 |
| R12 | −14.223 | d12= | 0.932 | | | |
| R13 | −5.642 | d13= | 0.577 | nd7 | 1.5844 | v7 | 28.22 |
| R14 | −6.959 | d14= | 0.040 | | | |
| R15 | 2.592 | d15= | 0.558 | nd8 | 1.5346 | v8 | 55.70 |
| R16 | 3.539 | d16= | 1.091 | | | |
| R17 | −12.948 | d17= | 0.400 | nd9 | 1.5346 | v9 | 55.70 |
| R18 | 3.929 | d18= | 0.186 | | | |
| R19 | ∞ | d19= | 0.210 | ndg | 1.5168 | vg | 64.17 |
| R20 | ∞ | d20= | 0.481 | | | |

Table 6 shows aspherical surface data of each lens of the camera optical lens 20 in the second embodiment of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −7.8882E+01 | 2.2260E−03 | −3.2200E−03 | −6.6761E−04 | 1.6293E−03 | −6.3853E−04 |
| R2 | −2.9245E+00 | −4.5700E−03 | 2.0954E−02 | −3.8842E−02 | 3.0650E−02 | −1.2628E−02 |
| R3 | −4.0767E+00 | −1.0123E−02 | 8.0306E−02 | −1.9043E−01 | 2.0860E−01 | −1.1715E−01 |
| R4 | −2.7174E+01 | 1.8430E−01 | −5.9384E−01 | 7.7560E−01 | −4.9246E−01 | 1.5666E−01 |
| R5 | −9.5094E−01 | −1.6434E−01 | 3.9047E−01 | −1.3456E+00 | 2.7518E+00 | −3.1807E+00 |

TABLE 6-continued

| | | | | | |
|---|---|---|---|---|---|
| R6 | −9.9000E+01 | 1.9920E−02 | −6.3236E−02 | 8.7682E−02 | −5.7086E−02 | 2.4731E−02 |
| R7 | −1.1925E+01 | −9.0852E−03 | −2.2386E−02 | 3.7474E−02 | 2.2471E−02 | −6.6712E−02 |
| R8 | −3.8812E+00 | −4.8222E−02 | 6.9434E−02 | −4.6453E−02 | 5.2534E−02 | −5.3118E−02 |
| R9 | 1.0789E+02 | −7.2728E−03 | 3.5464E−02 | −8.7987E−02 | 1.0032E−01 | −6.6890E−02 |
| R10 | 2.5345E+01 | −2.4380E−02 | 6.3696E−02 | −1.3794E−01 | 1.4772E−01 | −1.0539E−01 |
| R11 | 4.7940E+00 | −3.2612E−02 | 5.3234E−02 | −9.1686E−02 | 1.1010E−01 | −9.4197E−02 |
| R12 | 8.1035E+01 | −1.8339E−02 | −1.7008E−02 | 5.1452E−02 | −8.5248E−02 | 8.2165E−02 |
| R13 | −1.3375E+00 | 2.7063E−02 | −1.6010E−02 | −4.6477E−02 | 8.0850E−02 | −6.7373E−02 |
| R14 | 4.5361E+00 | 1.0843E−02 | −4.5012E−02 | 2.5162E−02 | 7.6628E−03 | −1.7212E−02 |
| R15 | −1.9955E+00 | −4.1281E−02 | −4.2370E−02 | 3.1375E−02 | −7.8695E−03 | −1.0474E−03 |
| R16 | −2.6214E+01 | 5.1068E−02 | −8.0273E−02 | 4.5202E−02 | −1.5883E−02 | 3.5696E−03 |
| R17 | 9.4501E+00 | −7.1183E−02 | 1.9329E−02 | −3.4623E−03 | 5.1762E−04 | −5.3442E−05 |
| R18 | −1.2199E−01 | −7.7327E−02 | 2.0656E−02 | −4.5721E−03 | 8.2123E−04 | −1.0884E−04 |

| | Conic coefficient | Aspheric surface coefficients | | | |
|---|---|---|---|---|---|
| | k | A14 | A16 | A18 | A20 |
| R1 | −7.8882E+01 | 9.3790E−05 | −4.3606E−06 | 0.0000E+00 | 0.0000E+00 |
| R2 | −2.9245E+00 | 2.7537E−03 | −2.5613E−04 | 0.0000E+00 | 0.0000E+00 |
| R3 | −4.0767E+00 | 3.2221E−02 | −3.4040E−03 | 0.0000E+00 | 0.0000E+00 |
| R4 | −2.7174E+01 | −2.2816E−02 | 1.0897E−03 | 0.0000E+00 | 0.0000E+00 |
| R5 | −9.5094E−01 | 2.2077E+00 | −9.2116E−01 | 2.1364E−01 | −2.1176E−02 |
| R6 | −9.9000E+01 | −8.9980E−03 | 1.7934E−03 | 0.0000E+00 | 0.0000E+00 |
| R7 | −1.1925E+01 | 3.9758E−02 | −7.5656E−03 | 0.0000E+00 | 0.0000E+00 |
| R8 | −3.8812E+00 | 2.4387E−02 | −3.7612E−03 | 0.0000E+00 | 0.0000E+00 |
| R9 | 1.0789E+02 | 2.1729E−02 | −2.7808E−03 | 0.0000E+00 | 0.0000E+00 |
| R10 | 2.5345E+01 | 4.3335E−02 | −7.3332E−03 | 0.0000E+00 | 0.0000E+00 |
| R11 | 4.7940E+00 | 4.5287E−02 | −8.5423E−03 | 0.0000E+00 | 0.0000E+00 |
| R12 | 8.1035E+01 | −4.6743E−02 | 1.4560E−02 | −1.9085E−03 | 0.0000E+00 |
| R13 | −1.3375E+00 | 3.0872E−02 | −7.5707E−03 | 7.7266E−04 | 0.0000E+00 |
| R14 | 4.5361E+00 | 9.4862E−03 | −2.6178E−03 | 3.6983E−04 | −2.1129E−05 |
| R15 | −1.9955E+00 | 1.0832E−03 | −2.5523E−04 | 2.5344E−05 | −8.2976E−07 |
| R16 | −2.6214E+01 | −5.0255E−04 | 4.1451E−05 | −1.6898E−06 | 1.9677E−08 |
| R17 | 9.4501E+00 | 3.0872E−06 | −6.4579E−08 | −1.6373E−09 | 7.3445E−11 |
| R18 | −1.2199E−01 | 9.6872E−06 | −5.3910E−07 | 1.6899E−08 | −2.2799E−10 |

Table 7 and table 8 show design data of inflexion points and arrest points of each lens of the camera optical lens 20 lens according to the second embodiment of the present disclosure.

TABLE 7

| | Number(s) of inflexion points | Inflexion point position 1 | Inflexion point position 2 | Inflexion point position 3 | Inflexion point position 4 |
|---|---|---|---|---|---|
| P1R1 | 1 | 1.445 | / | / | / |
| P1R2 | 1 | 1.545 | / | / | / |
| P2R1 | 2 | 1.165 | 1.375 | / | / |
| P2R2 | 4 | 0.565 | 0.765 | 1.145 | 1.365 |
| P3R1 | 0 | / | / | / | / |
| P3R2 | 1 | 0.785 | / | / | / |
| P4R1 | 2 | 1.055 | 1.125 | / | / |
| P4R2 | 0 | / | / | / | / |
| P5R1 | 1 | 0.895 | / | / | / |
| P5R2 | 2 | 0.825 | 1.165 | / | / |
| P6R1 | 3 | 0.735 | 1.125 | 1.305 | / |
| P6R2 | 0 | / | / | / | / |
| P7R1 | 1 | 1.645 | / | / | / |
| P7R2 | 1 | 1.835 | / | / | / |
| P8R1 | 2 | 0.675 | 2.125 | / | / |
| P8R2 | 1 | 0.755 | / | / | / |
| P9R1 | 2 | 1.955 | 3.315 | / | / |
| P9R2 | 1 | 0.605 | / | / | / |

TABLE 8

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 1 | 1.295 |
| P4R1 | 0 | / |
| P4R2 | 0 | / |
| P5R1 | 1 | 1.175 |
| P5R2 | 0 | / |
| P6R1 | 1 | 1.355 |
| P6R2 | 0 | / |
| P7R1 | 0 | / |
| P7R2 | 0 | / |
| P8R1 | 1 | 1.215 |
| P8R2 | 1 | 1.315 |
| P9R1 | 0 | / |
| P9R2 | 1 | 1.185 |

Figure 6:
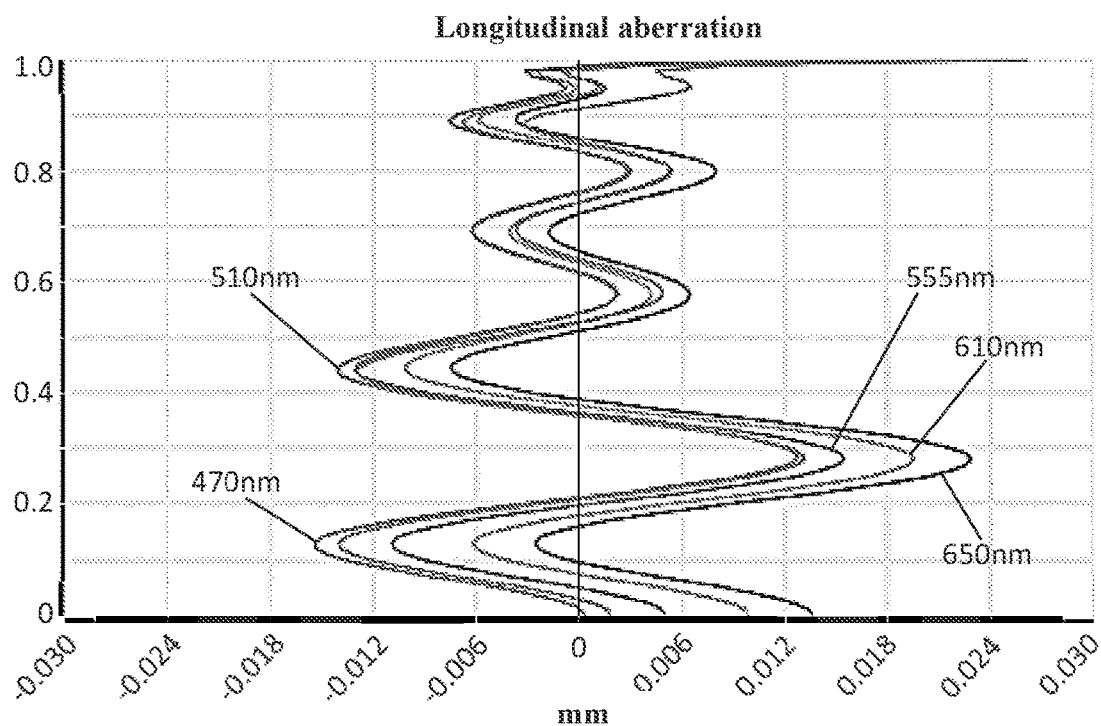
FIG. 6 is a schematic diagram of a longitudinal aberration of the camera optical lens shown in FIG. 5.
Figure 7:
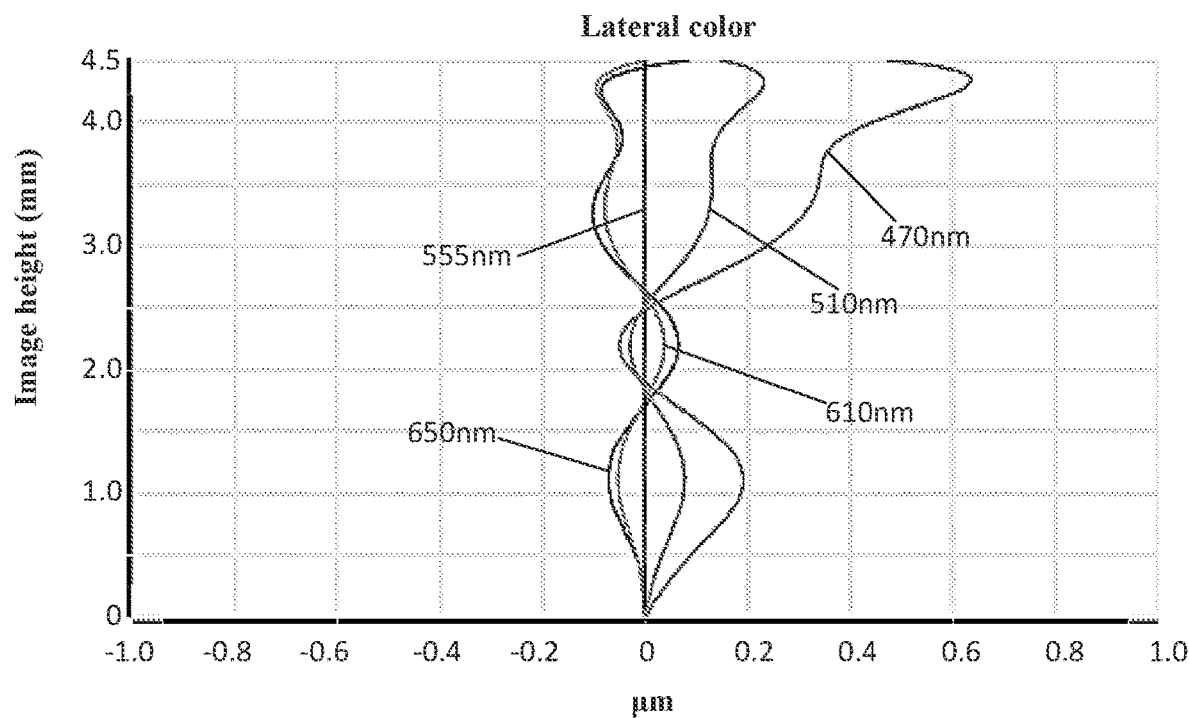
FIG. 7 is a schematic diagram of a lateral color of the camera optical lens shown in FIG. 5.
Figure 8:
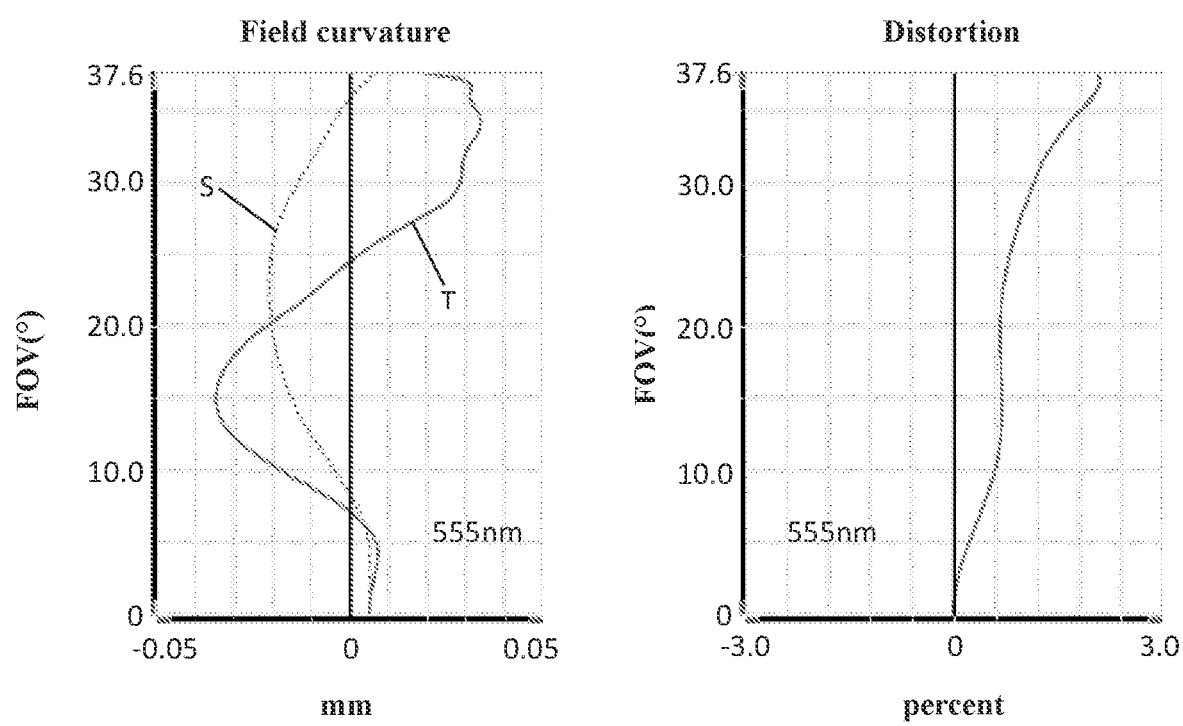
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm and 470 nm after passing the camera optical lens 20 according to the second embodiment. FIG. 8 illustrates a field curvature and a distortion of light with a wavelength of 555 nm after passing the camera optical lens 20 according to the second embodiment. A field curvature S in FIG. 8 is a field curvature in a sagittal direction, and T is a field curvature in a meridian direction.

As shown in Table 13, the second embodiment satisfies the above conditions.

In this embodiment, an entrance pupil diameter (ENPD) of the camera optical lens 20 is 2.537 mm, an image height (IH) of 1.0H is 4.500 mm, and a field of view (FOV) in a diagonal direction is 75.19°. Thus, the camera optical lens 20 meets the design requirements of wide-angle and ultra-thin. Its on-axis and off-axis aberrations are fully corrected, thereby achieving excellent optical characteristics.

Third Embodiment

Figure 9:
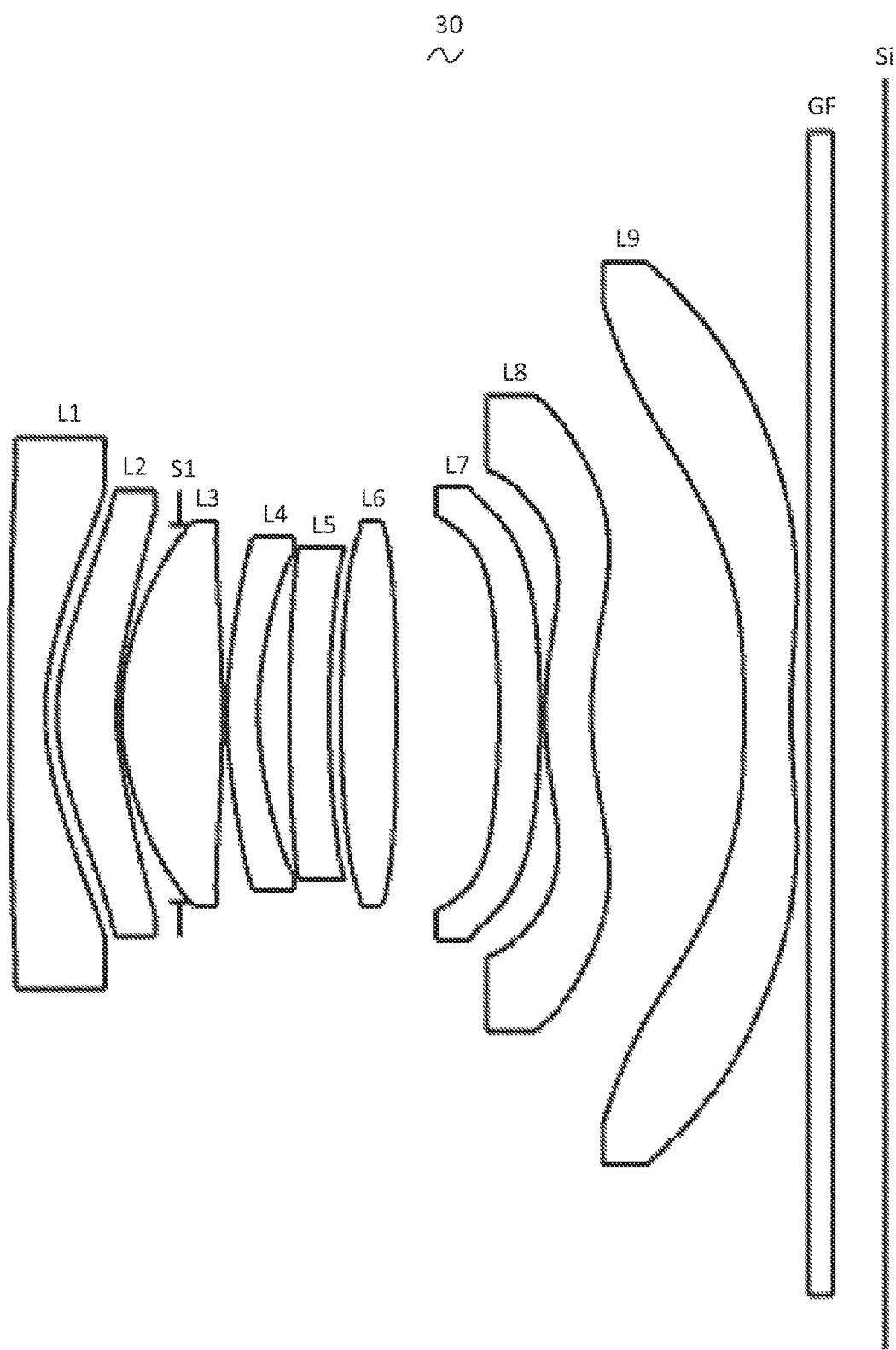
FIG. 9 is a schematic diagram of a structure of a camera optical lens according to a third embodiment of the present disclosure.

FIG. 9 shows a camera optical lens 30 of the third embodiment of the present disclosure, the third embodiment is basically the same as the first embodiment and involves symbols having the same meanings as the first embodiment, and only differences therebetween will be described in the following.

The camera optical lens 30 includes, from an object side to an image side: a first lens L1, a second lens L2, an aperture S1, a third lens L3, a fourth lens L4, a fifth lens L5, a sixth lens L6, a seventh lens L7, an eighth lens L8 and an ninth lens L9. The third lens L3 has a positive refractive power and the fifth lens L5 has a negative refractive power. The image-side surface of the second lens L2 is concave in the paraxial region, the image-side surface of the third lens L3 is convex in the paraxial region, the object-side surface of the fifth lens L5 is convex in the paraxial region, and the image-side surface of the fifth lens L5 is concave in the paraxial region.

Table 9 and Table 10 show design data of the camera optical lens 30 in the embodiment of the present disclosure.

TABLE 9

|     | R       | d    |         | nd     |     | vd    |
|-----|---------|------|---------|--------|-----|-------|
| S1  | ∞       | d0=  | −1.447  |        |     |       |
| R1  | 42.359  | d1=  | 0.300   | nd1    | 1.5444 | v1 | 55.82 |
| R2  | 1.651   | d2=  | 0.100   |        |     |       |
| R3  | 1.424   | d3=  | 0.512   | nd2    | 1.5444 | v2 | 55.82 |
| R4  | 1.682   | d4=  | 0.035   |        |     |       |
| R5  | 1.443   | d5=  | 0.873   | nd3    | 1.5444 | v3 | 55.82 |
| R6  | −7.460  | d6=  | 0.035   |        |     |       |
| R7  | 2.706   | d7=  | 0.268   | nd4    | 1.6700 | v4 | 19.39 |
| R8  | 2.017   | d8=  | 0.267   |        |     |       |
| R9  | 12.758  | d9=  | 0.340   | nd5    | 1.6700 | v5 | 19.39 |
| R10 | 6.826   | d10= | 0.100   |        |     |       |
| R11 | 6.454   | d11= | 0.476   | nd6    | 1.5346 | v6 | 55.70 |
| R12 | −61.276 | d12= | 0.883   |        |     |       |
| R13 | −5.752  | d13= | 0.350   | nd7    | 1.5844 | v7 | 28.22 |
| R14 | −6.981  | d14= | 0.041   |        |     |       |
| R15 | 2.32    | d15= | 0.400   | nd8    | 1.5346 | v8 | 55.70 |
| R16 | 2.600   | d16= | 1.307   |        |     |       |
| R17 | −11.7   | d17= | 0.401   | nd9    | 1.5346 | v9 | 55.70 |
| R18 | 4.013   | d18= | 0.153   |        |     |       |
| R19 | ∞       | d19= | 0.210   | ndg    | 1.5168 | vg | 64.17 |
| R20 | ∞       | d20= | 0.448   |        |     |       |

Table 10 shows aspherical surface data of each lens of the camera optical lens 30 in the third embodiment of the present disclosure.

TABLE 10

| | Conic coefficient | Aspheric surface coefficients | | | | |
|---|---|---|---|---|---|---|
| | k | A4 | A6 | A8 | A10 | A12 |
| R1  | 9.9000E+01  | −2.0379E−03 | 9.9546E−04  | −9.8397E−05 | 1.8586E−05  | −1.2794E−05 |
| R2  | −4.0875E+00 | −5.5377E−02 | 1.0387E−01  | −1.2411E−01 | 9.1995E−02  | −3.9296E−02 |
| R3  | −4.8406E+00 | −7.4894E−03 | 6.8296E−02  | −1.5748E−01 | 1.5564E−01  | −7.8255E−02 |
| R4  | −1.8157E+01 | 1.3319E−01  | −3.2447E−01 | 3.4099E−01  | −1.6697E−01 | 3.1623E−02  |
| R5  | −9.6383E−01 | −2.0949E−02 | 5.0939E−01  | −1.1954E+00 | 1.8826E+00  | −1.8435E+00 |
| R6  | −9.7586E+01 | 3.6693E−02  | −1.0249E−01 | 1.3562E−01  | −9.0756E−02 | 3.7248E−02  |
| R7  | −1.2884E+01 | −3.8053E−04 | −7.2920E−02 | 5.2132E−02  | 1.1944E−01  | −1.8702E−01 |
| R8  | −4.8608E+00 | −6.3518E−02 | 9.2091E−02  | −1.8067E−01 | 3.6430E−01  | −3.5278E−01 |
| R9  | 1.0262E+02  | −1.0780E−02 | 6.5225E−02  | −1.9548E−01 | 2.9118E−01  | −2.3592E−01 |
| R10 | 2.7010E+01  | −4.0443E−02 | 1.2983E−01  | −2.4987E−01 | 2.6702E−01  | −1.8694E−01 |
| R11 | 1.5207E+01  | −6.0911E−02 | 9.5573E−02  | −8.4963E−02 | 2.3028E−02  | 1.0813E−02  |
| R12 | 3.3285E+02  | −2.8908E−02 | −9.0634E−03 | 7.1216E−02  | −1.3583E−01 | 1.4155E−01  |
| R13 | 9.8850E+00  | 1.8233E−02  | 5.9357E−02  | −2.8130E−01 | 4.4653E−01  | −4.0256E−01 |
| R14 | 1.3514E+01  | 4.6689E−03  | 2.0151E−02  | −2.0335E−01 | 3.6434E−01  | −3.3914E−01 |
| R15 | −3.5434E+00 | −4.8283E−02 | −2.4164E−02 | −7.8373E−02 | 1.5103E−01  | −1.2475E−01 |
| R16 | −2.0121E+01 | 9.4377E−02  | −1.6388E−01 | 1.0833E−01  | −4.4519E−02 | 1.1565E−02  |
| R17 | 8.8259E+00  | −9.3075E−02 | 4.5133E−02  | −1.6130E−02 | 3.8478E−03  | −5.7054E−04 |
| R18 | −1.1284E−01 | −1.1347E−01 | 4.6466E−02  | −1.5889E−02 | 3.8012E−03  | −5.9637E−04 |

| | Conic coefficient | Aspheric surface coefficients | | | |
|---|---|---|---|---|---|
| | k | A14 | A16 | A18 | A20 |
| R1  | 9.9000E+01  | 1.0144E−06  | 9.4957E−08  | 0.0000E+00  | 0.0000E+00  |
| R2  | −4.0875E+00 | 8.7552E−03  | −7.8959E−04 | 0.0000E+00  | 0.0000E+00  |
| R3  | −4.8406E+00 | 1.9535E−02  | −1.9221E−03 | 0.0000E+00  | 0.0000E+00  |
| R4  | −1.8157E+01 | 1.4039E−03  | −8.5212E−04 | 0.0000E+00  | 0.0000E+00  |
| R5  | −9.6383E−01 | 1.1308E+00  | −4.2461E−01 | 8.9112E−02  | −7.9740E−03 |
| R6  | −9.7586E+01 | −1.1082E−02 | 1.8897E−03  | 0.0000E+00  | 0.0000E+00  |
| R7  | −1.2884E+01 | 9.4703E−02  | −1.6420E−02 | 0.0000E+00  | 0.0000E+00  |
| R8  | −4.8608E+00 | 1.5264E−01  | −2.3035E−02 | 0.0000E+00  | 0.0000E+00  |
| R9  | 1.0262E+02  | 9.5388E−02  | −1.5144E−02 | 0.0000E+00  | 0.0000E+00  |
| R10 | 2.7010E+01  | 8.0688E−02  | −1.5765E−02 | 0.0000E+00  | 0.0000E+00  |
| R11 | 1.5207E+01  | −5.1588E−03 | 1.2682E−04  | 0.0000E+00  | 0.0000E+00  |
| R12 | 3.3285E+02  | −8.6898E−02 | 2.9262E−02  | −4.1416E−03 | 0.0000E+00  |
| R13 | 9.8850E+00  | 2.1122E−01  | −6.0659E−02 | 7.3225E−03  | 0.0000E+00  |
| R14 | 1.3514E+01  | 1.8531E−01  | −5.9979E−02 | 1.0617E−02  | −7.8654E−04 |
| R15 | −3.5434E+00 | 5.8415E−02  | −1.6132E−02 | 2.4704E−03  | −1.6324E−04 |
| R16 | −2.0121E+01 | −1.8261E−03 | 1.6199E−04  | −6.6769E−06 | 5.9255E−08  |
| R17 | 8.8259E+00  | 5.1732E−05  | −2.7606E−06 | 7.7786E−08  | −8.4913E−10 |
| R18 | −1.1284E−01 | 5.9808E−05  | −3.7082E−06 | 1.3028E−07  | −1.9965E−09 |

Table 11 and Table 12 show design data inflexion points and arrest points of the respective lenses in the camera optical lens 30 according to the third embodiment of the present disclosure.

TABLE 11

| | Number(s) of inflexion points | Inflexion point position 1 | Inflexion point position 2 |
|---|---|---|---|
| P1R1 | 1 | 1.705 | / |
| P1R2 | 1 | 1.335 | / |
| P2R1 | 1 | 1.145 | / |
| P2R2 | 2 | 1.225 | 1.345 |
| P3R1 | 0 | / | / |
| P3R2 | 1 | 0.795 | / |
| P4R1 | 0 | / | / |
| P4R2 | 0 | / | / |
| P5R1 | 0 | / | / |
| P5R2 | 0 | / | / |
| P6R1 | 1 | 1.345 | / |
| P6R2 | 0 | / | / |
| P7R1 | 1 | 1.485 | / |
| P7R2 | 1 | 1.605 | / |
| P8R1 | 1 | 0.595 | / |
| P8R2 | 1 | 0.705 | / |
| P9R1 | 2 | 2.025 | 3.075 |
| P9R2 | 1 | 0.495 | / |

TABLE 12

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 1 | 1.305 |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 0 | / |
| P8R1 | 1 | 1.005 |
| P8R2 | 1 | 1.215 |
| P9R1 | 0 | / |
| P9R2 | 1 | 0.955 |

Figure 10:
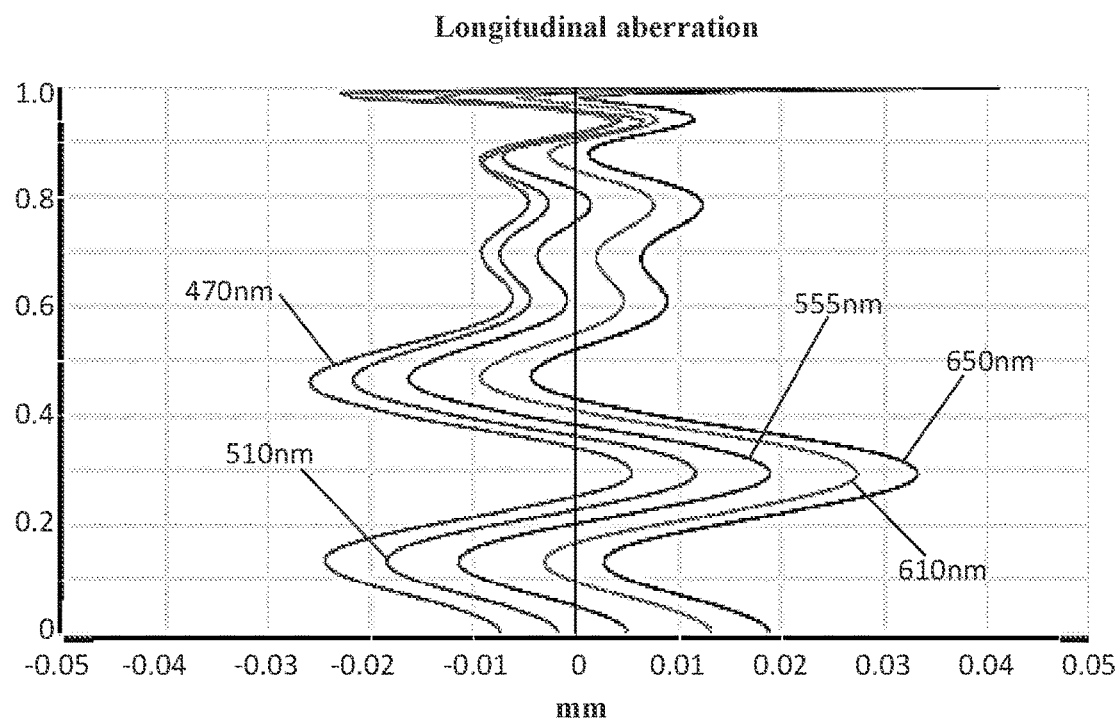
FIG. 10 is a schematic diagram of a longitudinal aberration of the camera optical lens shown in FIG. 9.
Figure 11:
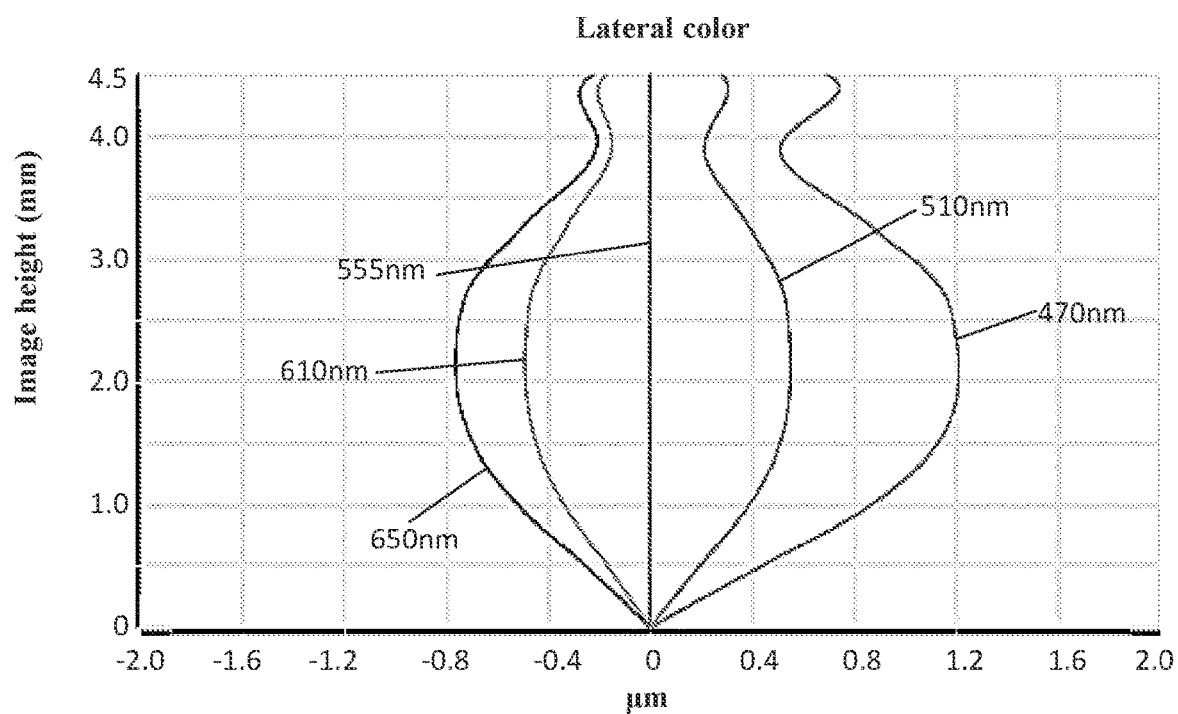
FIG. 11 is a schematic diagram of a lateral color of the camera optical lens shown in FIG. 9.
Figure 12:
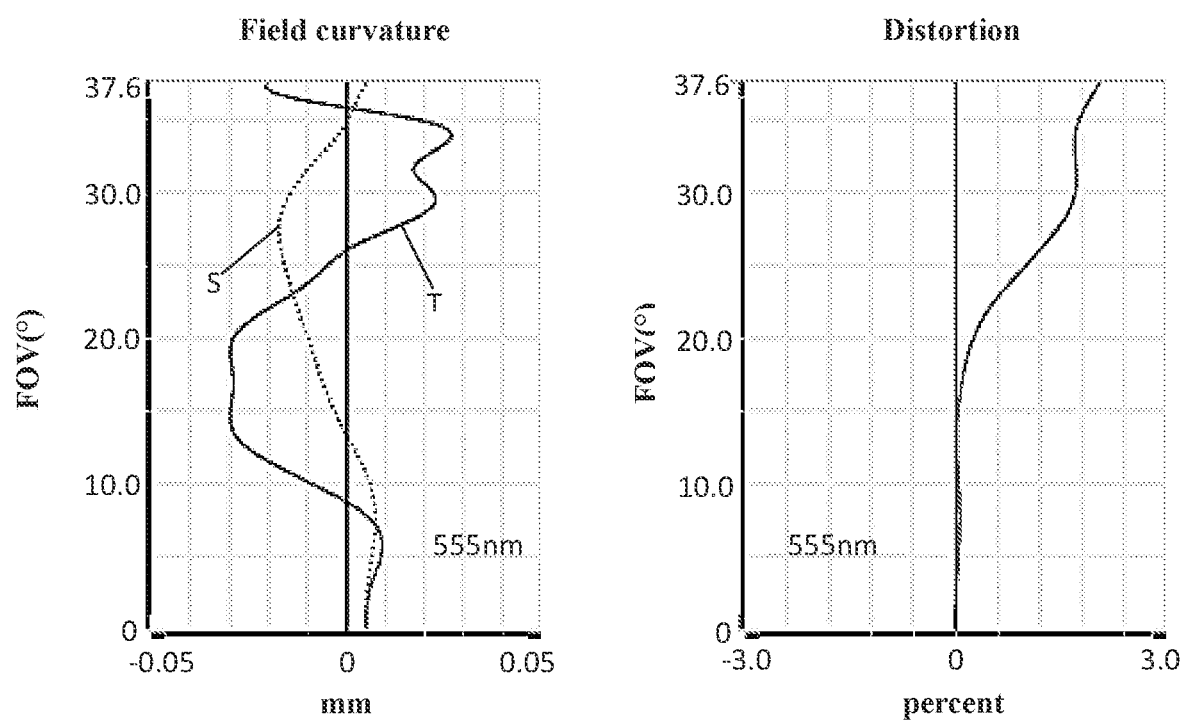
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30 according to the third embodiment, respectively. FIG. 12 illustrates a field curvature and a distortion of light with a wavelength of 555 nm after passing the camera optical lens 30 according to the third embodiment. In FIG. 12, a field curvature S is a field curvature in a sagittal direction, and T is a field curvature in a meridional direction.

Table 13 in the following lists values corresponding to the respective conditions in the embodiment according to the above conditions. Obviously, the camera optical lens 30 in the embodiment satisfies the above conditions.

In this embodiment, an entrance pupil diameter (ENPD) of the camera optical lens 30 is 2.515 mm, an image height (IH) of 1.0H is 4.500 mm, and a field of view (FOV) in a diagonal direction is 75.20°. Thus, the camera optical lens 30 meets the design requirements of wide-angle and ultra-thin. Its on-axis and off-axis aberrations are fully corrected, thereby achieving excellent optical characteristics.

TABLE 13

| Parameters and conditions | Fist embodiment | Second embodiment | Third embodiment |
|---|---|---|---|
| f1/f | −1.54 | −1.01 | −0.55 |
| d13/d14 | 3.21 | 14.43 | 8.54 |
| f | 5.732 | 5.734 | 5.735 |
| f1 | −8.831 | −5.791 | −3.154 |
| f2 | 2.500 | 100.000 | 10.000 |
| f3 | −5.221 | 2.743 | 2.293 |
| f4 | −406.330 | −13.457 | −13.881 |
| f5 | 34.606 | −23.606 | −22.227 |
| f6 | 68.224 | 11.032 | 10.913 |
| f7 | −51.706 | −60.513 | −62.085 |
| f8 | 12.245 | 14.975 | 26.814 |
| f9 | −5.259 | −5.574 | −5.522 |
| f12 | 3.471 | −5.812 | −4.029 |
| FNO | 2.28 | 2.26 | 2.28 |
| TTL | 7.292 | 7.499 | 7.499 |
| IH | 4.500 | 4.500 | 4.500 |
| FOV | 75.19° | 75.19° | 75.20° |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens, comprising nine lenses, the nine lenses from an object side to an image side being:
   a first lens with a negative refractive power;
   a second lens with a positive refractive power;
   a third lens;
   a fourth lens with a negative refractive power;
   a fifth lens;
   a sixth lens with a positive refractive power;
   a seventh lens with a negative refractive power;
   an eighth lens with a positive refractive power; and
   a ninth lens with a negative refractive power;
   wherein the camera optical lens satisfies the following conditions:

$$-1.60 \leq f1/f \leq -0.50;\ 3.00 \leq d13/d14 \leq 15.00;\ 1.80 \leq R9/R10 \leq 7.00;$$

where
   f denotes a focal length of the camera optical lens;
   f1 denotes a focal length of the first lens;
   d13 denotes an on-axis thickness of the seventh lens;
   d14 denotes an on-axis distance from an image-side surface of the seventh lens to an object-side surface of the eighth lens,
   R9 denotes a central curvature radius of an object-side surface of the fifth lens,
   R10 denotes central curvature radius of an image-side surface of the fifth lens.

2. The camera optical lens according to claim 1, further satisfying the following conditions:

$$0.54 \leq (R1+R2)/(R1-R2) \leq 2.95;\ 0.02 \leq d1/TTL \leq 0.13;$$

where
   R1 denotes a central curvature radius of an object-side surface of the first lens;
   R2 denotes a central curvature radius of an image-side surface of the first lens;
   d1 denotes an on-axis thickness of the first lens;
   TTL denotes a total track length of the camera optical lens.

3. The camera optical lens according to claim 1, further satisfying the following conditions:

$$0.22 \leqslant f2/f \leqslant 26.16; -24.08 \leqslant (R3+R4)/(R3-R4) \leqslant 158.15; 0.02 \leqslant d3/\text{TTL} \leqslant 0.18;$$

where
f2 denotes a focal length of the second lens;
R3 denotes a central curvature radius of an object-side surface of the second lens;
R4 denotes a central curvature radius of an image-side surface of the second lens;
d3 denotes an on-axis thickness of the second lens;
TTL denotes a total track length of the camera optical lens.

4. The camera optical lens according to claim 1, further satisfying the following conditions:

$$-1.82 \leqslant f3/f \leqslant 0.72; -1.36 \leqslant (R5+R6)/(R5-R6) \leqslant 3.51; 0.02 \leqslant d5/\text{TTL} \leqslant 0.17;$$

where
f3 denotes a focal length of the third lens;
R5 denotes a central curvature radius of an object-side surface of the third lens;
R6 denotes a central curvature radius of an image-side surface of the third lens;
d5 denotes an on-axis thickness of the third lens;
TTL denotes a total track length of the camera optical lens.

5. The camera optical lens according to claim 1, further satisfying the following conditions:

$$-141.78 \leqslant f4/f \leqslant -1.56; 3.43 \leqslant (R7+R8)/(R7-R8) \leqslant 12.13; 0.02 \leqslant d7/\text{TTL} \leqslant 0.06;$$

where
f4 denotes a focal length of the fourth lens;
R7 denotes a central curvature radius of an object-side surface of the fourth lens;
R8 denotes a central curvature radius of an image-side surface of the fourth lens;
d7 denotes an on-axis thickness of the fourth lens;
TTL denotes a total track length of the camera optical lens.

6. The camera optical lens according to claim 1, further satisfying the following conditions:

$$-8.23 \leqslant f5/f \leqslant 9.06; 0.68 \leqslant (R9+R10)/(R9-R10) \leqslant 5.01; 0.02 \leqslant d9/\text{TTL} \leqslant 0.12;$$

where
f5 denotes a focal length of the fifth lens;
R9 denotes a central curvature radius of an object-side surface of the fifth lens;
R10 denotes a central curvature radius of an image-side surface of the fifth lens;
d9 denotes an on-axis thickness of the fifth lens;
TTL denotes a total track length of the camera optical lens.

7. The camera optical lens according to claim 1, further satisfying the following conditions:

$$0.95 \leqslant f6/f \leqslant 17.85; -1.62 \leqslant (R11+R12)/(R11-R12) \leqslant -0.12; 0.02 \leqslant d11/\text{TTL} \leqslant 0.11;$$

where
f6 denotes a focal length of the sixth lens;
R11 denotes a central curvature radius of an object-side surface of the sixth lens;
R12 denotes a central curvature radius of an image-side surface of the sixth lens;
d11 denotes an on-axis thickness of the sixth lens;
TTL denotes a total track length of the camera optical lens.

8. The camera optical lens according to claim 1, further satisfying the following conditions:

$$-21.65 \leqslant f7/f \leqslant -6.01; -20.72 \leqslant (R13+R14)/(R13-R14) \leqslant -1.88; 0.02 \leqslant d13/\text{TTL} \leqslant 0.12;$$

where
f7 denotes a focal length of the seventh lens;
R13 denotes a central curvature radius of an object-side surface of the seventh lens;
R14 denotes a central curvature radius of the image-side surface of the seventh lens;
TTL denotes a total track length of the camera optical lens.

9. The camera optical lens according to claim 1, further satisfying the following conditions:

$$1.07 \leqslant f8/f \leqslant 7.01; -35.14 \leqslant (R15+R16)/(R15-R16) \leqslant -4.28; 0.03 \leqslant d15/\text{TTL} \leqslant 0.11;$$

where
f8 denotes a focal length of the eighth lens;
R15 denotes a central curvature radius of the object-side surface of the eighth lens;
R16 denotes a central curvature radius of an image-side surface of the eighth lens;
d15 denotes an on-axis thickness of the eighth lens;
TTL denotes a total track length of the camera optical lens.

10. The camera optical lens according to claim 1, further satisfying the following conditions:

$$-1.94 \leqslant f9/f \leqslant -0.61; 0.24 \leqslant (R17+R18)/(R17-R18) \leqslant 0.80; 0.03 \leqslant d17/\text{TTL} \leqslant 0.09;$$

where
f9 denotes a focal length of the ninth lens;
R17 denotes a central curvature radius of an object-side surface of the ninth lens;
R18 denotes a central curvature radius of an image-side surface of the ninth lens;
d17 denotes an on-axis thickness of the ninth lens;
TTL denotes a total track length of the camera optical lens.

* * * * *